UNITED STATES PATENT OFFICE 2,425,555

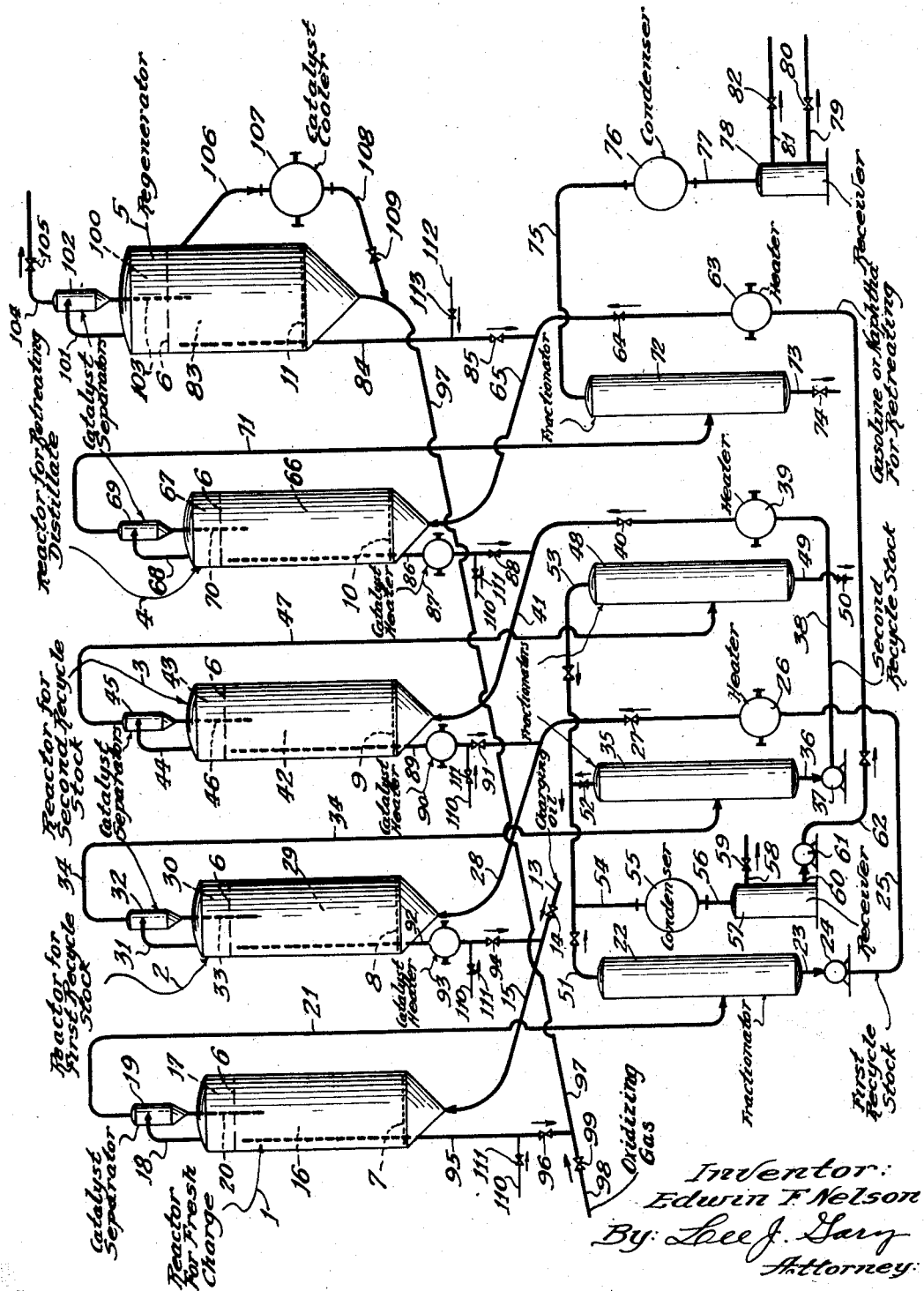

CATALYTIC CONVERSION OF HYDROCARBONS

Edwin F. Nelson, Chicago, Ill., assignor to Universal Oil Products Company, Chicago, Ill., a corporation of Delaware Application September 30, 1943, Serial No. 504,426

4 Claims. (Cl. 196—52)

The invention relates to an improved process for catalytically cracking hydrocarbon oil to produce substantial yields of motor gasoline or gasoline fractions suitable as base stock for aviation gasoline in a plurality of concomitant cracking steps.

In one embodiment of the invention the final step of the process comprises the treatment of gasoline fractions derived from the preceding steps for the purpose of reducing its olefin content and increasing its susceptibility to the addition of lead tetraethyl and similar antiknock agents for increasing its octane rating. This retreatment is accomplished in the presence of cracking catalysts which are subsequently employed in the preceding conversion steps of the process and the term "catalytic cracking" is herein used in a broad sense to apply to the reaction accomplished in the retreating operation, as well as to the reaction accomplished in the preceding conversion steps.

A cracking catalyst of a siliceous type is preferably employed in the present process and may comprise either a natural or a synthetic composite of silica with one or more metal oxides, such as alumina, zirconia and magnesia and is in the form of subdivided solid particles. Various satisfactory methods of preparing such catalysts are now known in the art and the present invention is not concerned with their specific method of preparation, except that they are preferably rendered substantially free of alkali metal compounds during their preparation so as to avoid rapid degradation or destruction of their catalytic activity by regeneration at relatively high temperatures.

In accordance with the preferred mode of operation provided by the invention, the mass of subdivided solid catalyst particles being employed to promote the hydrocarbon conversion or cracking reaction in each stage of the process is maintained in a turbulent fluid-like condition and each of the confined reaction zones contains a turbulent fluid-like mass or bed of catalyst, in which the solid particle concentration is relatively high. Also a light phase which contains a materially lower solid particle concentration is maintained above the fluid-like bed so that a major portion of the catalyst particles is separated within the fluid-like bed from the outgoing stream of vaporous and gaseous conversion products. To accomplish this and maintain the level or upper extremity of the fluid bed at a point below the vapor-gas outlet in each of the reaction zones, catalyst for transportation to another reaction step of the process or to the regenerating step, as the case may be, is withdrawn from the relatively dense fluid-like bed in each of the reaction zones below the dense phase level, rather than being carried from the reaction zone in the outgoing stream of vaporous and gaseous conversion products, and thereafter separated from the vapors and gases.

The regenerating step of the process, in which the activity of the catalyst is restored by burning therefrom deleterious combustible deposits formed by the cracking operation, is conducted in a confined regenerating zone wherein a relatively dense fluid-like mass or bed of the catalyst particles undergoing regeneration is maintained and in which a light phase of materially lower catalyst particle concentration is maintained between the upper extremity of this fluid-like bed and the gas outlet from the regenerating zone. To maintain the dense phase level at a suitable point below the vapor gas outlet, a stream of regenerated catalyst particles to be used in promoting the cracking reaction is withdrawn in regulated amounts from said fluid bed beneath the dense phase level.

One of the primary objects of the invention is to provide an improved catalytic cracking process, employing the features above mentioned, in which a high yield of gasoline or gasoline fractions of the desired high quality is obtained by subjecting the initial charging oil and insufficiently converted intermediate liquid fractions produced within the system to catalytic cracking in a plurality of successive steps each maintained under optimum operating conditions for the particular oil undergoing conversion therein.

I have found that the intermediate liquid conversion products of a catalytic cracking operation (i. e., the reflux condensate formed by fractionation of the vaporous and gaseous conversion products to separate gasoline and normally gaseous fractions) are generally more refractory to catalytic cracking treatment than the stock from which these products were derived, particularly with respect to the activity of the catalyst employed for promoting their conversion. The invention therefore provides for a general counter-current flow of catalyst and hydrocarbon reactants between the successive stages of the operation, whereby the catalyst, following its regeneration, is employed successively on the various oils supplied to the different cracking steps in the order of their increasing susceptibility to cracking treatment and is regenerated for further use within the system following its contact with the initial charging oil.

Preferably, the charging stock for that step of the process to which the catalyst is last supplied prior to its return to the regenerating operation comprises a virgin charging oil of the nature of straight-run gas oil or the like which is highly susceptible to catalytic cracking treatment, while that stage of the process to which the freshly regenerated catalyst is supplied operates either on gasoline fractions produced in the preceding cracking stages or, in case the retreating step is not employed, it will operate on intermediate liquid conversion products of one or more preceding cracking steps which are relatively refractory to catalytic cracking treatment as compared with the initial charging oil. When retreatment of the gasoline fractions is employed, the process utilizes at least three successive cracking steps, including the retreating step. Without the retreating operation the process employs at least two successive cracking steps.

The accompanying drawing diagrammatically illustrates one specific form of apparatus in which the improved process provided by the invention may be successfully conducted.

Referring to the drawing, the apparatus here illustrated comprises the separate reaction vessels 1, 2, 3 and 4 and the regenerating vessel 5 in each of which a fluid-like bed of subdivided solid catalyst particles is maintained, the approximate upper extremity of the fluid bed being indicated in each vessel by the broken line 6. Each of the vessels 1 to 5 inclusive is of substantially cylindrical form and vertically disposed and has a substantially conical bottom head and an upper head which, in the case illustrated, is of curved contour or semi-elliptical form. A suitable perforate member or grid for distributing the incoming fluid hydrocarbon reactants and catalyst particles substantially uniformly over the cross-section of the conical portion of the shell is disposed in each of the reaction vessels 1 to 4 inclusive and is indicated in the respective vessels by the reference numerals 7, 8, 9 and 10. A similar perforate member or distributing grid 11 is also preferably provided in regenerator 5 to distribute the incoming oxygen-containing gas employed for regenerating the catalyst and the incoming catalyst substantially uniformly over the cross-section of the cylindrical portion of the vessel.

Tracing the flow of fluid hydrocarbon reactants and resulting conversion products through the various reaction zones and succeeding fractionating and recovery equipment: the initial charging oil is supplied through line 13 and valve 1 to line 15 wherein it is commingled, as will be later described, with a stream of subdivided solid catalyst withdrawn from reactor 2 and transports the catalyst into the lower portion of reactor 1, through which the oil vapors and resulting vaporous and gaseous conversion products flow upwardly in contact with the relatively dense fluid-like bed 16 of subdivided solid catalyst particles maintained in this zone.

The vaporous and gaseous conversion products are disengaged from the major portion of the catalyst particles as they enter the light phase 17 maintained above fluid bed 16 and are directed with the relatively small amount of remaining entrained catalyst particles through line 18 to suitable separating equipment 19 which, in the case illustrated, is a centrifugal or cyclone type separator. Catalyst separated from the outgoing vapors and gases in separator 19 is directed from the lower portion of the latter through line 20 back into the fluid bed 16. The vapors and gases pass from the upper portion of separator 19 through line 21 to suitable fractionating equipment indicated at 22, wherein the normally gaseous fractions and gasoline boiling range hydrocarbons of the desired end-point are separated by fractionation from the heavier insufficiently converted components. The latter are collected as reflux condensate in the lower portion of fractionator 22 and directed therefrom through line 23 to pump 24 from which this first recycle stock is directed through line 25, heater 26 and valve 27 into line 28.

In line 28 the first recycle stock from fractionator 22 is commingled, as will be later described, with catalyst withdrawn from reactor 3 and transports the catalyst into the lower portion of reactor 2, in which a relatively dense fluid-like bed 29 of the catalyst particles is maintained. Conversion of the first recycle stock to produce additional yields of the desired gasoline fractions is accomplished in the reactor 2 as the hydrocarbon vapors and resulting vaporous and gaseous conversion products pass upwardly through the fluid bed 29. The vaporous and gaseous conversion products are directed with the relatively small amount of entrained catalyst particles from the light phase 30 maintained above the fluid bed 32 through line 31 to the catalyst separator 32. Separated catalyst particles are returned from the latter zone through line 33 to the fluid bed 29 and vaporous and gaseous conversion products are directed from the upper portion of the catalyst separator through line 34 to fractionator 35.

In fractionator 35 normally gaseous fractions and gasoline of the desired end-boiling point are separated from a second recycle stock comprising the remaining insufficiently converted components of the vapors supplied to fractionator 35, and this recycle stock is withdrawn from the lower portion of fractionator 35 through line 36 to pump 37 by means of which it is supplied through line 38, heater 39, valve 40 and line 41 to the lower portion of reactor 3, in which it is converted to produce additional yields of the desired gasoline gractions.

In line 41 the second recycle stock or reflux condensate from fractionator 35 is commingled, as will be later described, with the stream of catalyst particles withdrawn from reactor 4 and transports the catalyst into the lower portion of reactor 3. As in the other reaction zones of the system, vapors and gases pass upwardly through reactor 3 in contact with the relatively dense fluid-like bed 42 of catalyst particles maintained in this zone and the vaporous and gaseous conversion products are directed with the remaining entrained catalyst particles from the light phase 43 maintained above the fluid bed 42 through line 44 to the catalyst separator 45. Separated catalyst particles are returned through line 46 to the fluid bed 42 and the vapors and gases are directed through line 47 to fractionator 48.

Normally gaseous fractions and gasoline fractions of the desired end-boiling point are separated from higher boiling fractions in fractionator 48 and the reflux condensate, comprising the higher boiling fractions is directed, in the case illustrated, from the lower portion of fractionator 48 through line 49 and valve 50 to cooling and storage or elsewhere, as desired. This product will normally comprise a relatively small yield, based on the initial charging oil, and will be of insufficient volume and such quality that further conversion thereof in a subsequent cracking step is not warranted.

Fractionated vapors and gases of the desired end-boiling point are directed, in the case illustrated, from fractionators 22, 35 and 48 through the respective lines 51, 52 and 53 and through line 54 to condenser 55. The resulting distillate and the remaining uncondensed light fractions, which may comprise all of the normally gaseous products of the cracking operations conducted in reactors 1, 2 and 3 and preferably also includes their 5 carbon atom fractions, are directed from condenser 55 through line 56 to collection and separation in receiver 57. The uncondensed vapors and/or gases are withdrawn through line 58 and valve 59, preferably to suitable further separating and gas concentrating equipment not pertinent to the present invention and, therefore, not illustrated. The condensate, comprising gasoline fractions of the desired initial and end-line boiling points collected in receiver 57, is directed through line 60, pump 61, line 62, heater 63, valve 64 and line 65 into the lower portion of reactor 4 in which it is catalytically retreated to improve its quality.

In line 65 the hydrocarbons to be retreated are commingled, as will be subsequently described, with a stream of freshly regenerated cracking catalyst withdrawn from regenerator 5 and transports the catalyst into the lower portion of reactor 4, wherein contact between the catalyst and the oil is obtained and the desired conversion reaction is effected in the relatively dense fluid-like bed 66 of catalyst particles maintained within this zone. The fluid hydrocarbon reactants and resulting vaporous and gaseous conversion products pass upwardly through the catalyst bed into the light phase 67 maintained above the latter in reactor 4 and are directed therefrom with remaining entrained catalyst particles through line 68 to the catalyst separator 69. Separated catalyst is returned from separator 69 through line 70 to the fluid bed 66 and the vaporous and gaseous conversion products are directed through line 71 to fractionator 72.

A final separation of normally gaseous conversion products and gasoline vapors of the desired end-boiling point from higher boiling products is effected in fractionator 72. The higher boiling fractions are withdrawn as reflux condensate from the lower portion of the fractionator through line 73 and valve 74 and may be supplied to cooling and storage or returned by well known means, not illustrated, to further cracking treatment in reactor 1, 2, 3 or 4, as desired, the selection depending upon which of these several reaction zones is supplied with other reactants which most closely approach the cracking susceptibility of the heavy fractions withdrawn from fractionator 72. The fractionated vapors and gases are directed from the upper portion of fractionator 72 through line 75 to condenser 76 wherefrom the resulting distillate and remaining uncondensed light fractions are directed through line 77 to separation in receiver 78. Distillate collected in receiver 78 is directed therefrom through line 79 and valve 80 to storage or to any desired further treatment and the uncondensed fractions, which preferably comprise $C_3$ and lighter gases, as well as all or a portion of the $C_5$ and/or $C_4$ fractions, are directed from receiver 78 through line 81 and valve 82, preferably to suitable further separating and gas concentrating equipment not pertinent to the present invention and not here illustrated.

Starting with the regenerator 5, the flow of catalyst through the system will now be traced. A stream of hot catalyst particles of relatively high activity is withdrawn from the relatively dense fluid-like bed 83 of catalyst undergoing regeneration in regenerator 5 and directed through standpipe 84 and the adjustable orifice or flow control valve 85 provided adjacent the lower end of the standpipe into line 65 where the hot catalyst particles are commingled, as previously mentioned, with the distillate for retreatment from receiver 57 and transported to reactor 4.

Catalyst of somewhat reduced activity, as a result of the contaminating conversion products accumulated thereon in reactor 4, is withdrawn from the fluid-like bed 66 in the latter zone and directed through standpipe 86, the catalyst heater 87 and the adjustable orifice or flow control valve 88 provided adjacent the lower end of standpipe 86 into line 41 wherein the catalyst stream is commingled, as previously mentioned, with the second recycle stock or reflux condensate from fractionator 35 and is transported therewith into reactor 3.

An additional accumulation of deleterious conversion products collects on the catalyst particles in reactor 3 and a stream of this catalyst of reduced activity is directed from the fluid-like bed 42 in reactor 3 through standpipe 89, the catalyst heater 90 and the adjustable orifice or flow control valve 91 into line 28 through which it is transported in the stream of first recycle stock or reflux condensate from fractionator 22 into reactor 2.

A stream of catalyst particles, upon which a further amount of deleterious heavy conversion products has been deposited, is directed from the fluid bed 29 in reactor 2 through standpipe 92, the catalyst heater 93 and the adjustable orifice or flow control valve 94 into line 15 wherein it commingles, as previously mentioned, with the fresh charging oil from line 13 and is supplied therewith to reactor 1.

Catalyst which has lost a substantial part of its cracking activity by the accumulation of deleterious combustible contaminants thereon by its successive contact in reactors 4, 3, 2 and 1 with the hydrocarbon reactants supplied to these respective zones is directed from the fluid-like bed 16 in reactor 1 through standpipe 95 or through the adjustable orifice or flow control valve 96 adjacent its lower end into transfer line 97. Here the stream of catalyst particles thus withdrawn from reactor 1 is commingled with a stream of incoming air or other oxidizing gas employed for burning combustible deposits from the catalyst, the oxidizing gas being supplied through line 98 and valve 99 to transfer line 97. The catalyst is transported through line 97 by the incoming oxygen-containing regenerating gas into the lower portion of regenerator 5 and a major portion of the combustible contaminants are burned from the catalyst by its contact with the oxidizing gas in the fluid bed 83 maintained within the regenerator.

As in each of the reaction vessels, a relatively light phase indicated at 100 is maintained in the regenerator above the relatively dense fluid-like bed 83 and combustion gases resulting from the regenerating operation are directed with entrained catalyst particles from the light phase in the regenerator through line 101 to the catalyst separator 102, from which separated catalyst particles are returned through line 103 to the fluid bed 83 in the regenerator and wherefrom the combustion gases are directed through line 104 and valve 105, preferably to suitable heat recovery equipment, not illustrated.

To control the temperature to which the catalyst is subjected in the regenerating step so as to prevent it from reaching a value at which damage or permanent impairment to the activity of the catalyst would result, provision is made for directing a stream of catalyst from the upper region of the fluid bed 83 in the regenerator through line 106 to a suitable catalyst cooler 107 which may, for example, be a heat exchanger or a waste-heat boiler. The resulting cooled catalyst is returned to the fluid bed in the regenerator via line 108, the adjustable orifice or flow control valve 109 and line 97.

Preferably, the temperature and quantity of the stream of catalyst supplied, as previously described, from regenerator 5 to reactor 4 is sufficient to satisfy the heat requirements of the conversion reaction being conducted in reactor 4 and, when desired, it may also supply the heat necessary for vaporizing the hydrocarbon reactants being supplied to reactor 4. In the latter case, heater 63 may be eliminated and distillate may be supplied from receiver 57 to line 65 in liquid state. Otherwise, heater 63, which may be any suitable form of heat exchanger or an externally fired tubular heater, for example, is employed to vaporize the distillate and heat it to or near the reaction temperature to be maintained in reactor 4.

The oil heaters 26 and 39 and/or the catalyst heaters 87, 90 and 93 are provided for the purpose of obtaining the desired reaction temperature in reactors 1, 2 and 3. Heater 87 supplies heat to the catalyst passing from reactor 4 to reactor 3 and heater 39 supplies heat to the oil passing from fractionator 35 to reactor 3 before it is commingled with the catalyst from reactor 4. Similarly, heater 90 supplies heat to the catalyst passing from reactor 3 to reactor 2 and heater 26 supplies heat to the oil passing from fractionator 22 to reactor 2 before it is commingled with the catalyst from reactor 3. Likewise, heater 93 supplies heat to the catalyst passing from reactor 2 to reactort 1 and, when desired, a heater of any suitable form, not illustrated, may be provided in line 13 for preheating the charging oil before it is commingled with the catalyst from reactor 2. Thus, any of the several streams of oil to be converted may, when desired, be substantially vaporized and heated to the reaction temperature desired for cracking the same before being commingled with the catalyst employed for promoting their conversion and, in addition all or a substantial portion of the required endothermic heat of reaction may be supplied to each of the reaction zones in the stream of catalyst supplied thereto. When desired, heater 26 and/or heater 39, like heater 63, may be omitted and a substantial portion of the sensible heat for bringing the hydrocarbons to reaction temperature, as well as latent heat for vaporizing the same, may be supplied in the catalyst stream.

Heaters 87, 90 and 93, as well as heaters 26, 39 and 63 may be of any desired form suitable for accomplishing their intended purpose and may employ any suitable heating medium, such as hot combustion gases, hot molten salt, superheated steam or the like. For example, it will often be convenient to employ catalyst cooler 107 connected with the regenerator as a steam generator or superheater and supply superheated steam from this zone to each or any of the catalyst heaters 87, 90 and 93. Alternatively the reaction vessels may be conviniently grouped about the regenerating vessel so that relatively hot catalyst from the regenerator may be supplied directly through one side of the exchangers 87, 90 and 93 to serve as a heating medium for catalyst withdrawn from the respective reactors and passed through the other side of the heat exchangers, the resulting cooled catalyst being returned to the regenerator. This will permit reducing the size of or eliminating the catalyst cooler 107. With either of these specific arrangements mentioned, it is often possible to obtain a substantial thermal balance between the regenerating step and the reaction steps.

Preferably, a suitable stripping and aerating medium, such as steam, for example, or other relatively inert gas is supplied in relatively small amounts to lines 86, 89, 92 and 95 on the upstream side of the respective valves 88, 91, 94 and 96 for the purpose of aerating and preventing excessive compaction of the columns of catalyst particles passing through these lines. The several lines 110 and valves 111 are provided for this purpose in the case illustrated. In the case of line 95, the quantity of steam or other substantially inert gas supplied through line 110 is preferably sufficient to substantially strip occluded light hydrocarbons from the catalyst particles being supplied to the regenerator to prevent the waste of such valuable hydrocarbons by their combustion in the regenerating step. In a similar manner, steam or other substantially inert gas is preferably supplied through line 112 and valve 113 to line 84 on the upstream side of valve 85 to aerate the column of catalyst particles passing therethrough and substantially strip the same of oxidizing gas and combustion gases.

It will, of course, be understood that the accompanying drawing and the preceding description thereof exemplifies only one specific application of the features of the invention and the drawing is not to be construed as limiting the broader aspects of the invention. For example, the provisions of the invention whereby two or more hydrocarbon oils are cracked under independently controlled operating conditions in the presence of a mass of catalyst which is used successively in the two or more cracking steps may be applied within the scope of the invention to two or more charging stocks of different cracking susceptibility, and initial charging oils from an external source may be supplied to each or any of the various cracking steps, either alone or together with intermediate liquid products of the process having a substantially corresponding susceptibility to catalytic cracking.

Although preferred in most instances, the aforementioned feature of using the same cracking catalyst successively for promoting the separate conversion of different oils without intermediate regeneration of the catalyst is not intended to be a limiting feature of the invention and I specifically contemplate an operation similar to that illustrated in the drawing and above described, for example, in which catalyst withdrawn from each of the reaction zones is at least partially regenerated. In this embodiment of the invention a common regenerating vessel may be employed to which catalyst from each of the reaction zones is supplied for regeneration and from which regenerated catalyst is returned in regulated amounts to each of the reaction zones or a separate regenerator may be employed for any one or more of the several reaction zones.

When, in accordance with the preferred embodiment of the invention, oils of different cracking susceptibility are converted in the presence of cracking catalyst of varying activity in the several reaction zones, the cracking susceptibility of the oil supplied to each of the reaction zones is preferably determined on the basis of its characterization factor. The characterization factor of an oil is a numerical designation now commonly understood in the art, indicating the relative paraffinicity of the oil. As applied to pure individual hydrocarbons, the characterization factor (K) may be defined as the cube root of its absolute boiling point in degrees Rankin, divided by its specific gravity at 60° F. However, in dealing with complex mixtures of the nature of most cracking stocks, the characterization factor of the oil may be defined as the cube root of its cubic average boiling point in degrees Rankin, divided by its specific gravity at 60° F. The cubic average boiling point can be estimated from the volumetric average boiling point by subtracting from the latter a correction factor obtained by a correlation between the volume average boiling point and the slope of the Engler distillation curve for the oil (see article by Smith & Watson, Industrial & Engineering Chemistry, Dec. 1937). When the oil has a characterization factor of 12 or more, it is considered predominantly paraffinic. As the characterization factor decreases, the paraffinicity of the oil also decreases and its refractivity to cracking increases. For example, an oil having a characterization factor of 12 is materially more susceptible to cracking than an oil having a characterization factor of say 11.80 and an oil having a characterization factor of say 11.87 has an intermediate cracking susceptibility.

Assuming then that the present process is to be operated employing three different cracking stocks having the characterization factors 12.25, 11.80 and 11.72, for example, using the same catalysts successively in the several cracking steps without intermediate regeneration, the fresh or freshly regenerated catalyst would, in accordance with the provisions of the invention, be supplied to the same reaction zone as the cracking stock having the K value of 11.72. It would next be used in the reaction zone handling the cracking stock having the K value of 11.80 and would then be employed to crack the stock having the K value of 12.25, following which the catalyst would be regenerated and returned to the first mentioned cracking step. This general principle of employing catalyst of increasing cracking activity for stocks of decreasing cracking susceptibility is employed in the preferred embodiment of the invention regardless of the source of the particular stock being treated in the respective cracking steps.

Except for the factor of catalyst activity which, in the preferred embodiment of the invention, varies in inverse relation to the characterization factor of the particular oil undergoing treatment in contact therewith, the operating variables, including reaction temperature, pressure and space velocity, employed in the several reaction zones may be regulated to suit requirements. It is within the scope of the invention to operate each of the reaction zones at substantially the same temperature or to employ different temperatures therein and the same applies to the operating pressure utilized and the space velocity. The term "space velocity" as here used refers to the quantity of oil contacted in a given time with a unit quantity of catalyst and is conveniently expressed as pounds of oil per hour, per pound of catalyst.

Operating conditions of temperature, pressure and space velocity suitable for cracking various types of oil are known to those familiar with the art and a detailed recitation of suitable operating conditions is, therefore, considered unnecessary to an understanding of the invention. In general, temperatures of the order of 850 to 1050° F. are most commonly employed with the silica-alumina type cracking catalysts in common use. The operating pressure employed in the reaction zone may range from substantially atmospheric to several hundred pounds superatmospheric pressure and, with a fluid bed operation of the type illustrated in the drawing, moderately superatmospheric pressures of the order of 5 to 50 pounds gauge, or thereabouts, are preferred. The weight hourly space velocity in the reaction zones may range from 0.25 to 8, or thereabouts. In general, space velocities of a relatively low order, ranging for example from 0.5 to 1, are preferred for highly refractory stocks (those having a low characterization factor), while higher space velocities may be used with satisfactory results on the substantially paraffinic stocks having a high characterization factor. Also, space velocities of a somewhat higher order may be employed for the production of motor fuel, as compared with those which are most suitable for the production of aviation base gasoline.

I claim as my invention:

1. A hydrocarbon oil conversion process which comprises maintaining subdivided solid cracking catalyst of progressively increasing activity at cracking temperature in a series of reaction zones, contacting hydrocarbons with the catalyst in each of said zones, independently fractionating the vapors from each zone to separate gasoline fractions from fractions heavier than gasoline, supplying a virgin charging oil heavier than gasoline to the first zone of the series containing the least active catalyst, supplying to the last zone of the series, containing the most active catalyst, gasoline fractions separated from the vapors from a preceding zone of the series, supplying to an intermediate zone of the series fractions heavier than gasoline separated from the vapors from said first zone, removing contaminated catalyst particles from said first zone and regenerating the same, introducing regenerated catalyst to said last zone, and transferring catalyst particles from the last zone to said intermediate zone and from the intermediate zone to said first zone.

2. The process as defined in claim 1 further characterized in that the hydrocarbon feed to said last zone comprises gasoline fractions separated from the vapors from said first zone.

3. The process as defined in claim 1 further characterized in that the hydrocarbon feed to said last zone comprises gasoline fractions separated from the vapors from said intermediate zone.

4. The process as defined in claim 1 further characterized in that the hydrocarbon feed to said last zone comprises gasoline fractions separated from the vapors from said first and intermediate zones.

EDWIN F. NELSON.

REFERENCES CITED

The following references are of record in the file of this patent:

UNITED STATES PATENTS

| Number | Name | Date |
|---|---|---|
| 1,867,841 | Joseph | July 19, 1932 |
| 2,296,722 | Marancik et al. | Sept. 22, 1942 |
| 2,300,032 | Kassel | Oct. 27, 1942 |
| 2,303,076 | Frolich | Nov. 24, 1942 |
| 2,304,128 | Thomas | Dec. 8, 1942 |
| 2,311,984 | Guild | Feb. 23, 1943 |
| 2,326,705 | Thiele et al. | Aug. 10, 1943 |
| 2,327,175 | Conn | Aug. 17, 1943 |
| 2,311,564 | Munday | Feb. 16, 1943 |
| 2,323,899 | Day et al. | July 13, 1943 |
| 2,328,773 | Benedict | Sept. 7, 1943 |
| 2,342,984 | Thomas | Feb. 29, 1944 |
| 2,358,888 | Thomas | Sept. 26, 1944 |
| 2,360,622 | Roetheli | Oct. 17, 1944 |
| 2,377,078 | Gerhold | May 29, 1945 |
| 2,339,874 | Nysewander | Jan. 25, 1944 |
| 2,387,088 | Oblad et al. | Oct. 16, 1945 |